United States Patent Office 3,291,721
Patented Dec. 13, 1966

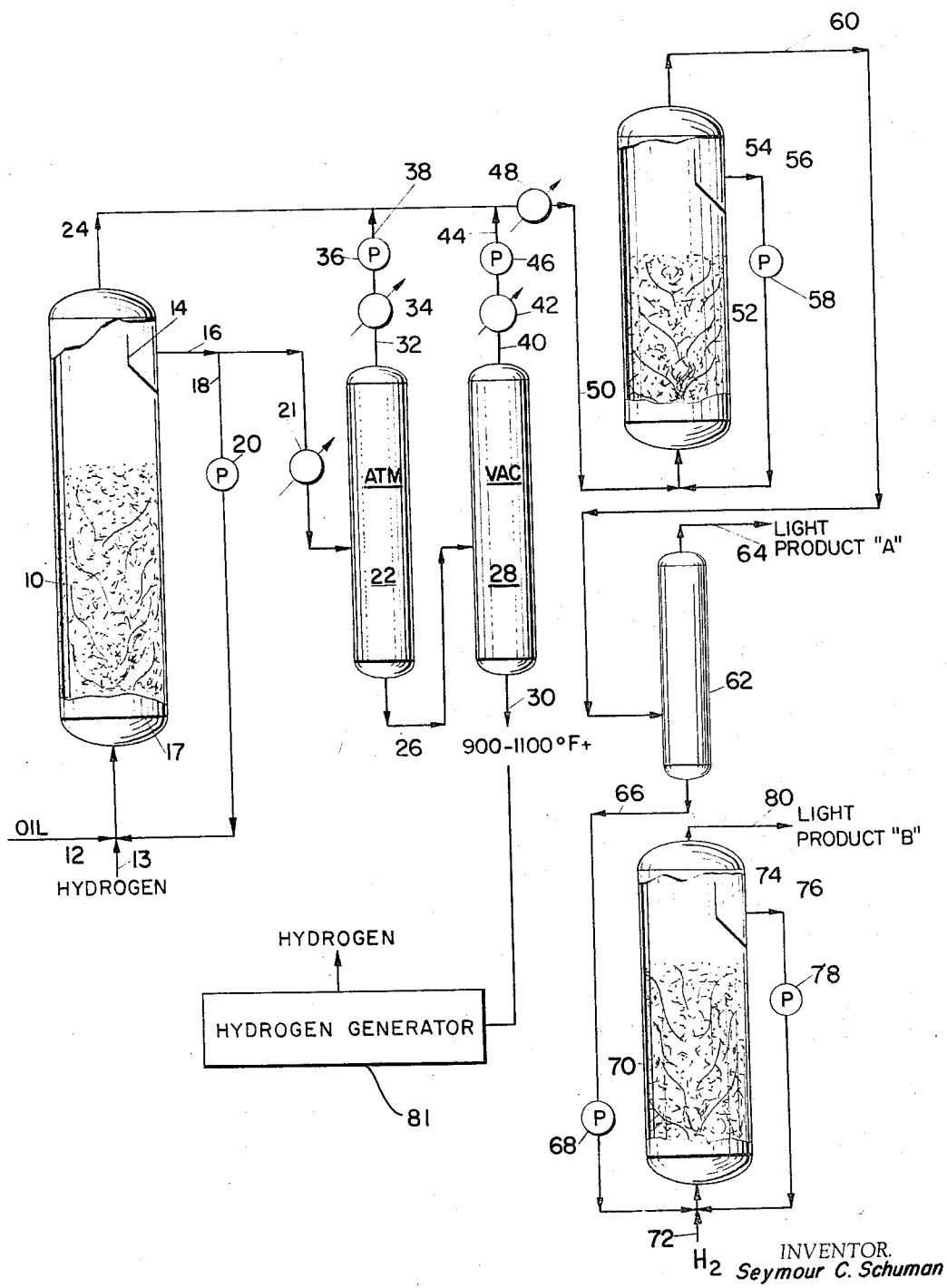

3,291,721
COMBINED HYDROCRACKING AND
HYDROFINING PROCESS
Seymour C. Schuman, Princeton, N.J., assignor to Hydrocarbon Research, Inc., New York, N.Y., a corporation of New Jersey
Filed June 13, 1963, Ser. No. 287,604
8 Claims. (Cl. 208—97)

This invention relates to the treatment of hydrocarbon oils with hydrogen in the presence of catalysts. More particularly, the invention is concerned with the treatment of heavy hydrocarbon oils to effect hydrocracking to lighter products, particularly to gasoline. It is an improvement on my prior Patent No. 3,050,459, issued August 21, 1962.

Hydrogenation has long been used to refine hydrocarbon oils and is a highly developed art insofar as the catalysts, temperatures, pressures and other process variables are concerned. Notwithstanding the extensive advances which have been made in hydrogenation, the initial costs of suitable catalysts and the cost of replacement of such catalysts remain an important economic problem in the commercial utilization of hydrogenation. Catalysts for the hydrodesulfurization of oils tend to become rapidly fouled with carbonaceous deposits and other contaminants in the charge stock, so that the activity of the catalyst can be maintained only by frequent regenerations or replacement. Regeneration of the catalyst necessitates interruption of the hydrodesulfurization operation or, as is more frequently the case, the provision of duplicate reactors so that while one reactor is on stream for the treatment of the charge stock, the other reactor is undergoing regeneration of the catalyst. In either case, the costs associated with regeneration or replacement of the catalyst materially affect the economics of the hydrodesulfurization process. These costs so increase when the charge stock is a heavy hydrocarbon oil that heretofore it has not been practical to refine such a heavy oil by the usual catalytic hydrodesulfurization process.

An important improvement in the art of treating heavy hydrocarbon oils in the presence of catalysts has been effected by a recent development of Keith and Layng described in the U.S. Patent 2,987,467. In accordance with that development, hydrogen treatment of a heavy hydrocarbon oil is advantageously carried out in two successive steps. The gist of that invention is the liquid-phase hydrocracking of heavy hydrocarbons as a preparatory operation so that the sulfur present in such hydrocarbons is better exposed to and more reactive with hydrogen during subsequent liquid-phase catalytic hydrogenation. By that invention, it has been found possible to diminish the quantity of catalyst used and, at the same time, reduce the frequency of regeneration of the catalyst or even eliminate such regeneration, since fouling up of the catalyst occurs to a much smaller degree than heretofore experienced.

In my foregoing invention, the very high boiling products leaving the first stage of the process were removed since it was found that the contamination of the hydrogenation catalyst in the second stage was due mainly to impurities which are present in the hydrocarbon oil to begin with and are almost entirely in the liquid hydrocarbon fraction boiling above 900° F. Such impurities which act as catalyst poisons include asphaltenes, highly condensed aromatic compounds, and inorganic or metallo-organic compounds. By eliminating these contaminants from the precracked hydrocarbons entering the secondary stage, the life of the catalyst is increased to a marked extent.

One of the features of my previous invention was the simple separation of the liquid and vapor phases from the first stage reactor at reactor outlet conditions. Thus, in many cases, the material passing to the secondary stage is simply the vapor effluent from the first stage reactor. However, in other cases, as shown in my application for patent, Serial No. 198,139, filed May 28, 1962, now U.S. Patent No. 3,183,179, the liquid phase effluent from the first stage reactor is further processed by flashing and even by vacuum distillation to yield additional charge to the secondary stage reactor. However, as mentioned, in all cases, the feed to the secondary stage contains little or no material boiling above 900–1100° F., so that contamination of the catalyst in said secondary stage is minimized.

It should be noted that in my previous invention, the feed to the second stage reactor contains hydrocarbonaceous material extending over the complete possible distillate boiling point range. Thus, the feed to this stage contains low boiling point hydrocarbons such as those generally noncondensible at room temperature, material boiling in the gasoline or naphtha range with an end point about 400° F., material in the furnace oil range boiling to about 700° F., and material in the gas oil range boiling to about 900–1100° F.

It is the object of the present invention to convert these hydrocarbons to high yields of gasoline and/or furnace oil, converting as much as possible the material boiling from about 700° F. to about 900–1100° F. To accomplish this, the second stage must be operated at conditions which are prescribed and limited to obtain optimum results in a third stage in which the major part of the cracking reactions are preferably carried out. If this is not done effectively, the third stage catalyst becomes rapidly poisoned and must be regenerated frequently, and even with frequent regenerations, yields gasoline and/or furnace oil of very poor quality.

Thus, it is an objective of the present invention to provide a superior process for the hydrogenation of heavy oils to produce a desirable proportion of gasoline and furnace oil.

A further object of the invention is to carry out the conversion in multiple stages so that secondary stages are not subjected to the deleterious effects of asphaltenes, resins, and organo-metallic compounds present in heavy oils, thus affording large economies in catalyst ultilization cost.

A further object of the present invention is to obtain flexibility in the secondary stages of treatment so that the ultimately desired products can be obtained of high quality, with the lowest possible investments and catalyst utilization costs. It is important that the method of accomplishing these objectives be simple to avoid increasing the investment and to avoid making the overall plant too complex.

To facilitate understanding of the present invention, reference is now made to the accompanying drawing which diagrammatically shows a typical flow sheet embodying the process of the invention.

The reactor 10 is adapted to treat preheated heavy oil supplied in line 12. The heavy oil is mixed with hydrogen from line 13, the hydrogen stream generally consisting of fresh hydrogen, and hydrogen recycled after condensation of liquid products as carried out conventionally (lines not shown). The hydrogen-oil mixture may be further combined with liquid recycle obtained from conduit 19 in the example shown by separating the liquid from the gas in separator 14, the liquid emerging from the reactor in line 16 and being pumped through line 18 without substantial cooling or further separation to finally combine with the hydrogen-fresh oil mixture entering the reactor. This combined feed enters reactor 10 through distributor plate 17 and is contacted at elevated temperature and pressure conditions elucidated by the Keith and Layng invention and by my earlier invention, Patent No. 3,050,-459.

In the reactor, the feed containing a substantial quantity of material boiling above 900–1100° F. is substantially converted to products boiling below 900–1100° F. which are both liquid and vapor, the vapor leaving the reactor in line 24 and the liquid in line 16.

The liquid effluent at 16, which may be cooled at 21 is then passed to the atmospheric flash tower 22 to separate the high boiling and low boiling elements. The high boiling elements from the atmospheric tower 22 then pass through line 26 to the vacuum tower 28 the bottoms from which are removed in line 30 and may be used as fuel. It is the feature of my original invention, Patent No. 3,050,459, that such removal of materials boiling above 900–1100° F. as described, markedly diminishes poisoning of the catalyst in subsequent hydrogenation stages since most of the asphaltenes and metallic poisons remaining in the product from reactor 10 are present in this heavy fraction.

The vapor effluent from the atmospheric flash tower 22 passes overhead in line 32 and is cooled in exchanger 34 after which it is passed by pump 36 through line 38 where it joins the vapor effluent in line 24 from reactor 10. Similarly, the vapor overhead in line 40 from the vacuum tower 28 is cooled in exchanger 42 and passed through line 44 using pump 46 where it joins the combined vapor stream. Thus, the combined stream lines 24, 38 and 44, passing to the after-reactors consist of the vapor effluent from reactor 10, and the overhead streams from distillation towers 22 and 28. This combined stream may be further cooled or heated in exchanger 48, and then passes through line 50 into the secondary reactor 52. Thus the feed to reactor 52 consists of all of the products from the primary reactor 10, except the very heavy material boiling above 900–1100° F. which has been eliminated at the bottom of the vacuum tower at 30.

The combined stream is contacted in reactor 52 with a catalyst which is active to further convert sulfur and nitrogen to hydrogen sulfide and ammonia. As shown in the diagram, the catalyst is in random motion as an ebullating bed. To minimize deleterious thermal effects, a "hot" liquid recycle stream is also provided in this case, using separator 54, line 56, and pump 58.

After treatment, the effluent from reactor 52 is passed through line 60 into a distillation tower as shown by vessel 62 which separates out a light product from line 64 and a higher boiling product from line 66. As will be shown in the detailed examples, the light product issuing from line 64 may have an end point which varies from about 300° F. to about 750° F. depending on the specific application to which the invention is made. The higher boiling product issuing from the column 62 in line 66 always contains material boiling above about 300° F. and in many cases contains some material boiling to about 900–1100° F.

The high boiling effluent in line 66 is pumped at 68 into the third reactor 70. Additional hydrogen may be provided through line 72. In reactor 70, final desulfurization, denitrogenation and conversion reactions are effected employing a catalyst with both hydrogenation and cracking activity. Again an ebullating bed with the solids in random motion in the liquid is preferably used. As shown, a "hot" liquid recycle system, composed of separator 74, line 76, and pump 78, may also be provided to minimize undesirable heat effects. The product from reactor 70 issuing through line 80 is predominantly composed of material boiling in the gasoline and furnace oil range, with only relatively small quantities, if any, of material boiling above 750° F.

Thus, in the example of the invention shown, a heavy oil containing at least 10% by volume of material boiling above 900–1100° F., and generally containing over 50% by volume of such heavy oil and often composed completely of such heavy oil, and furthermore containing large amounts of sulfur, nitrogen and metallic and organometallic compounds, is ultimately converted to yield a small amount of heavy material boiling above 900–1100° F. issuing from line 30, which may be used for fuel or to provide by means of a known type of hydrogen generator 81 the hydrogen needed in the process, together with high grade naphtha, kerosene, and diesel oil issuing from lines 64 and 80.

It should be understood that the flow sheet shown to illustrate an embodiment of the invention is highly simplified for the purpose of clarity. For example, the light product streams issuing from lines 64 and 80 contain large amounts of unconsumed hydrogen which may be separated from the hydrogen components to provide a large part of the gas used in lines 13 and 72. Liquid recycle streams may be provided around reactors 10, 52 and 70. For example, some of the heavy product from line 30 may be passed to reactor 10, whereas some of the material issuing from line 66 may be recycled back to reactor 62. Similarly, the stream issuing from reactor 70 into line 80 may be fractionated or flashed to yield a low boiling and high boiling fraction, the latter which may be passed back to reactor 70.

The catalyst in reactor 10 is in an ebullated bed as described by Johanson in U.S. Patent 2,987,465. In this state, the catalyst is expanded over its settled, static volume due to the velocities of the fluids passing upwards into the reactor. The motion of the catalyst makes the reactor free from pressure drop limitations prevalently obtained in fixed beds due to carbon formation, and results in a narrow temperature gradient from the top to bottom of the reactor although considerable heat is liberated by the hydrogenation and refining reactions. Although, similarly, the catalyst in reactors 52 and 70 is shown to be ebullated, and in fact, this is a preferred embodiment of the invention, other possibilities are apparent to those skilled in the art. For example, since the feed material passing into reactor 70 is relatively light, and since little coking problems are likely to be experienced, it may be preferable in some cases to utilize catalyst in a fixed bed in this reactor.

In the embodiment shown, advantage is taken of the invention of Pichler, U.S. Patent 2,910,433, to cope with the large amounts of heat produced in reactors 10, 52, and 70 by use of "hot" reactor effluent liquid recycle. It should be understood that there are other possible arrangements for such recycle wherein the recycle lines are within the reactor as shown in Garbo application, Serial No. 154,147, filed November 22, 1961, now U.S. Patent No. 3,151,060 or where a pump is not employed.

What is essential in the present invention is the use of a multiple stage reaction system represented by reactors 10, 52 and 70 with the catalyst in reactor 10 in ebullated state, the separation of the vapor and liquid streams from reactor 10 in lines 24 and 16 respectively, the removal of deleterious high boiling product components from line 30, the relatively simple and economic production of a combined stream in line 50 containing relatively little material deleterious to subsequent catalytic action, and the treatment of this material in two additional catalytic stages with intermediate separation of light material between the second and third reactors.

As promoting agents for the hydrogenation and cracking operations in reactor 10, it has been established that solids as diverse as clay, iron ore, and iron-clay waste from aluminum recovery operations, as well as fresh and spent synthetic hydrogenation catalysts will have considerable effectiveness. The effectiveness of so diverse a range of materials suggests that many other ores, minerals, spent and fresh synthetic materials can be advantageously used. It is possible that the quality common to these solids is the presence of a least a small amount of elements in groups V, VI, VII and VIII; however, I do not wish to be limited by such a hypothesis which is in general so difficult to establish with certainty. Empirically, however, it has been established that the preferred solid to be used in reactor 10 depends on the characteristics of the heavy oil charge to the reactor, principally on the content of metals and organo-metallic compounds present in the heavy oil. For example, if the heavy oil contains a large amount of metallic compounds, a relatively inexpensive comminuted solid is used such as clay, whereas if the content of metals in the heavy oil is moderate or small, fresh and spent synthetic hydrogenation catalyst are preferably employed. Similarly, the particle size of the catalyst in reactor 10 may vary depending on the character of the charge stock and the degree of conversion required so that in some cases it is desirable to use discrete extruded particles as coarse as $\frac{1}{16}$" in diameter, where in other cases material of an average particle size of 100 mesh or even 200 mesh may prove to be more economical.

The solid utilized in reactor 52 is a synthetic catalyst of the type generally referred to as sulf-active hydrogenation catalyst. Among the more prominent catalysts which may be used are cobalt deposited on alumina, tungsten sulfide and the mixed oxides of iron and chromium. Nickel and mixtures of nickel and cobalt are also prevalently utilized as sulf-active hydrogenation catalysts. Supports which may be used are alumina, magnesia, or mixtures of silica alumina; small amounts of fluoride may be added to these supports to promote cracking when desired. A preferred catalyst for this reactor would be cobalt molybdate deposited on alumina containing from 5 to 25% silica.

Similarly, such sulf-active hydrogenation catalysts are utilized in reactor 70. In this case, a preferred catalyst would be a mixture of nickel and tungsten sulfides deposited on a support which contains more silica than alumina, and which contains from 1 to 5% fluoride.

Reduction of the molecular weight or average boiling point of the feed oil may be obtained in any or all of the reactors. In reactor 10, at least 25% by volume of the oil boiling above about 900–1100° F. is cracked to material boiling below this temperature range. However, the preferred conversion in this reaction reduces from 50% to 80% by volume of the oil boiling above 900–1100° F. to lower boiling materials. In reactor 52, a significant amount of material boiling above 750° F., may be converted to products boiling in the naphtha (gasoline) and furnace oil ranges. Additional conversion of material boiling above 750° F. is obtained in reactor 70 so that the combined light product ultimately obtained from lines 64 and 80 contains not more than 20% by volume of material boiling above 750° F.

All of the reactors in the process are utilized at elevated temperatures and pressures. In reactor 10, the temperature will generally not exceed 1000° F., and preferably will be in the range of 800–950° F., while the pressure will not exceed 5000 pounds per square inch gauge (p.s.i.g.) and preferably will fall in the range of 800 to 3000 p.s.i.g. In reactor 52, the temperature will in no case exceed 875° F., and is preferably between 600 and 800° F. The pressure in reactor 52 will in no case exceed 3000 p.s.i.g., and is preferably between 600 and 2500 p.s.i.g. In reactor 70, the temperature will not exceed 850° F., and is preferably between 650 and 825° F., while the pressures in reactor 70 are within the same limits as those utilized in reactor 52 although they are generally lower.

The products ultimately recovered from lines 64 and 80 are essentially gasoline, kerosene, and diesel fuel. It is a feature of the invention that the proportionate amounts of the principal products obtained can be varied to meet the requirements of a particular time or locality. For example, in the United States of America, it is generally more desirable to produce gasoline than kerosene and/or diesel oil; however, the market in the winter tends to be better for heating oil products and poorer for gasoline. In this case, temperatures in reactors 64 and/or 80 may be lowered when it is decided to prepare for winter requirements, producing larger amounts of the heavier heating oils. Similarly, in Europe, where the demand for heating oils is far greater than in the United States, reactors 64 and 80 are operated to produce a predominant quantity of these fractions.

*Example 1*

The application considered is that for a European refinery where it is desirable to produce more heating oil together with as little naphtha as possible from residuum raw materials. In the specific case presented, it was desired that such heating oils contain a relatively low pour point; for this reason, the boiling range of the heating oil was desired to be from 350° F. to 650° F., instead of from 350° F. to 750° F. as in prevalent European practice. The plant is designed as in the figure referred to above. The charge stock oil fed through line 12 is 10,000 barrels per day (b./d.) of Kuwait vacuum residuum (pitch) of 8.3° API gravity and a sulfur content of 5.3 w. percent. This stock contains 95% of material boiling above 975° F. and over 100 p.p.m. of nickel and vanadium mostly as soluble porphyrin-type compounds. The catalyst utilized in reactor 10 is a mixture of fresh cobalt molybdate catalyst, and discard cobalt-molybdate catalyst from reactor 52. Make-up catalyst is continuously added to and withdrawn from reactor 10 at the rate of 300 pounds per day. Reactor 10 is operated at a total pressure of 2250 p.s.i.g., a temperature of 825° F., and a space velocity of 0.5 v./hr./v. Fresh and recycle hydrogen are fed through pipe 13 corresponding to 7000 standard cubic feet per barrel (s.c.f./bbl.) of fresh feed or about 70 million standard cubic feet per day. A liquid recycle stream is established in line 18 corresponding to a recycle ratio of 20 based on feed, sufficient to maintain the $\frac{1}{32}$" extruded catalyst in the ebullated state as described by Johanson.

The conversion reactions effected in reactor 10 are sufficient to convert about 75% of the material boiling above 975° F. in the Kuwait residuum to lighter products. Thus, 2400 b./d. of pitch is removed from pipe 30. This pitch has a gravity of about 8° API, a sulfur content of 2.5 w. percent, and as mentioned previously, boils completely above 975° F. It is completely satisfactory for refinery fuel, for which it is used in the example shown.

Reactor 52 contains a synthetic catalyst composed of cobalt and molybdenum oxides (probably sulfides in the reacted state) on alumina. This catalyst is likewise in the form of $\frac{1}{32}$" extrudates and is ebullated in the same way as described for reactor 10. The pressure in this reactor is 1500 p.s.i.g. and its temperature maintained at about 840° F. No additional hydrogen is added over that fed to reactor 10. The space velocity in reactor 52 is 1.2 volumes of feed per hour per volume of reactor space (based on the liquid equivalent volume of the hydrocarbons in the feed of the reactor). Catalyst is admitted to and withdrawn from reactor 52 at the rate of 380 pounds per day.

The products from reactor 52 pass to the fractionator 62 to obtain low boiling and high boiling streams. In the embodiment of this invention illustrated by this example, 1700 b./d. of light product, essentially gasoline boiling to 350° F. is removed at line 64 as shown in the figure. However, two other fractions are removed from tower 62, the heavy fraction boiling above 650° F. being recycled to extinction back to reactor 52, whereas the fraction boiling between 350° F. to 650° F. passes to reactor 70. Additional hydrogen is also added to reactor 70 at the rate of 22 MM s.c.f.d. Reactor 70 is operated at a pressure of 1400 p.s.i.g. and at a temperature of 750° F. The catalyst in reactor 70 is a mixture of nickel and cobalt molybdate supported on alumina. This catalyst is about 100 mesh in average particle size and classified narrowly to provide less than 10% of material finer than 200 mesh. With the reactor geometry employed, the use of such smaller size catalyst makes it unnecessary to utilize the "hot" recycle stream shown originating in line 76 in the figure. About 80 pounds per day of fresh catalyst is added and spent catalyst withdrawn from reactor 70. The product obtained from line 80 contains an additional 400 b./d. of gasoline boiling to 350° F. and 7700 b./d. of material boiling from 350° F. to 650° F. which may be further fractionated into kerosene and diesel oil cuts. Thus, the total effect of the process of this invention is to convert 10,000 b./d. of pitch of a lower value than heavy fuel oil used for ships bunkers, to 2400 b./d. of similar but somewhat higher quality pitch and 9800 b./d. of lighter and more desirable products. The proportion of 7700 b./d. of furnace oils and 2100 b./d. of gasoline is highly desirable in Europe. The total liquid yield of 122 v. percent is not unusual in embodiments of this invention and is due to the excellent selectivity of hydrogen absorption and consumption in the process shown.

It should also be noted that the hydrogen utilization in the example shown was 26 MM s.c.f.d. of which 22 MM s.c.f.d. was consumed in the chemical reactions occurring in the process, whereas the remaining 4 MM s.c.f.d. was vented with the waste gas to be ultimately used for refinery fuel.

*Example 2*

In the embodiment of the invention to be described in the following example, the charge stock is a vacuum bottoms from a California crude. In this case, it is desirable to convert the vacuum bottoms to as high yield of gasoline as can be obtained.

The charge stock has an API gravity of 9°, a sulfur content of 1.89 and a viscosity of 358 SFS at 210° F. Its content of vanadium and nickel is moderate being 76 p.p.m. and 125 p.p.m. respectively. A total of 10,000 b./d. of this material is fed to reactor 10, along with 80 MM s.c.f.d. of hydrogen through line 13.

The catalyst in reactor 10 is 100 mesh synthetic material composed of cobalt and molybdenum oxides supported on alumina. At the conditions used, the geometry in reactor 10 will permit an ebullating bed to be obtained without use of the recycle system composed of line 18 and pump 20. The pressure in reactor 10 is 3000 p.s.i.g., the temperature 845° F. and the space velocity 1 v./hr./v. Catalyst is "turned over" at the rate of 280 pounds per day.

In this case, it was possible to sample the combined effluent from reactor 10 composed of the material withdrawn from line 30 and the material obtained in line 50. This combined effluent consisted of 1600 b./d. of gasoline boiling to 400° F., 2500 b./d. of material boiling from 400° F. to 650° F., 4200 b./d. of material boiling between 650 and 975° F. and 2100 b./d. of material boiling above 975° F. the latter being removed from line 30.

The material boiling below 975° F. passed through line 50 into reactor 52 is contacted therein with an ebullated bed of catalyst composed of cobalt and molybdenum oxides on a support containing 15% silica and 85% alumina. The catalyst is in the form of 1/32" beads and is in an ebullating condition in reactor 52 with the required velocities being obtained by use of the "hot" recycle system shown in the figure by separator 54, line 56, and pump 58. Turnover of catalyst is at a rate of 400 pounds per day. Reactor 52 is operated at a pressure of 1900 p.s.i.g. and a temperature of about 790° F., with no hydrogen added over that obtained from reactor 10.

The products from reactor 52 are passed through line 60 to fractionating column 62 where a separation is obtained to produce an overhead consisting predominantly of material boiling below 400° F., and a bottoms fraction containing all of the material boiling higher than 400° F. A total of 2000 b./d. of the bottoms fraction from column 62 is recycled back to reactor 52. The remainder of the material is passed through line 66 into reactor 70. In this case, no additional hydrogen is provided through line 72. The catalyst in reactor 70 is composed of nickel and tungsten sulfides supported on silica-alumina containing about 5% fluoride. The catalyst is in the form of 1/8" extrudates and, in this case, is not ebullated. There is no recycle through separator 74, line 76, and pump 78. The pressure in reactor 70 is 1500 p.s.i.g. and the temperature about 700° F. Products are obtained as shown through line 80. However, in this case, these products are passed to another fractionator not shown in the figure, wherein a separation is again made of material boiling below 400° F. from that boiling above 400° F. The material boiling above 400° F. is then recycled to extinction in reactor 70. Thus, the only product obtained from the system other than the 2100 b./d. of heavy tar removed from line 30 is 10,400 b./d. of naphtha boiling to 400° F. In this case, the total yields of liquid products is 12,500 b./d., again illustrating the superior liquid volumetric recovery obtained in various embodiments of this invention.

While I have shown preferred forms of embodiment of my invention, I am aware that modifications may be made thereto within the scope and spirit of my invention as described herein and as claimed in the claims appended hereinafter.

I claim:

1. In a process for refining and substantially converting a heavy oil having at least 10% by volume of hydrocarbons boiling above 900–1100° F., in which said oil while substantially in the liquid state and in the presence of hydrogen at a pressure of at least 800 p.s.i.g. is cracked in a primary reaction zone in contact with a particulate solid expanded at least 10% over its settled volume by the action of the fluid passing upwardly through it to place the solid in motion in the liquid and wherein substantially all residual hydrocarbons boiling above about 900 to 1100° F. are separated and removed from the thus cracked oil, and wherein the remainder of said cracked oil substantially free of hydrocarbons boiling above about 900–1100° F. are reacted in a second reaction zone with hydrogen at a pressure of at least 800 p.s.i.g. in the presence of a sulf-active hydrogenation catalyst, the improvement which comprises separating the effluent of the second reaction zone into a low boiling fraction and a higher boiling fraction, and reacting in a third reaction zone, said higher boiling fraction in the presence of hydrogen at a pressure of at least 800 p.s.i.g. in contact with a dual function hydrogenation and cracking catalyst at a temperature in the range of 650°–825° F. to substantially provide no more than 20 volume percent of material boiling above 750° F. in the total non-residual product obtained from the process.

2. A process for refining a heavy oil as claimed in claim 1 wherein the heavy oil contains over 50% by volume of hydrocarbons boiling above 900–1100° F., and up to about 25% by volume, based on feed of said fraction, is separated and removed from the effluent from the first stage cracking step.

3. A process for refining a heavy oil as claimed in claim 1 wherein the second stage reaction step is accomplished with particulate solids within the size range of 1/32" to 200 mesh, and said particulate solids are of the class of cobalt molybdenum catalyst and clay.

4. A process for refining a heavy oil as claimed in claim 1 wherein the second stage sulf-active hydrogenation catalyst is of the class of silica and alumina having a deposit of nickel, tungsten and sulfur thereon.

5. A process for refining a heavy oil as claimed in claim 1 wherein the third stage sulf-active hydrogenation catalyst is of the class of silica and alumina having a deposit of nickel, tungsten and sulfur thereon.

6. A process for refining a heavy oil as claimed in claim 1 wherein the reactions in the second and third stages are accomplished by passing liquid and gas upwardly through each bed of catalyst to expand the respective catalyst beds at least 10% and sufficient to place the catalyst in random motion in the liquid, and effluent from the upper part of the respective reaction zones is recycled in part to the lower part of the reaction zones to maintain a substantially uniform temperature in each zone.

7. A process for refining a heavy oil as claimed in claim 1 wherein the residual hydrocarbons boiling above 900° to 1100° F. are converted to hydrogen, the effluent from the second stage is predominantly a gasoline boiling range fraction, and the effluent from the last stage is in the kerosene and diesel oil boiling range.

8. A process for refining a heavy oil as claimed in claim 1 wherein a production distribution is obtained of up to 25% of the product boiling in the 900° to 1100° F. range, up to 60% of the product boiling in the range of I.B.P. up to 750° F., and up to 15% of the product boiling in the range of 750° F. to 900–1100° F.

References Cited by the Examiner
UNITED STATES PATENTS

| | | | |
|---|---|---|---|
| 3,050,459 | 8/1962 | Schuman | 208—58 |
| 3,183,179 | 5/1965 | Schuman | 208—97 |

DELBERT E. GANTZ, *Primary Examiner.*

SAMUEL P. JONES, *Examiner.*